United States Patent [19]

Komeya et al.

[11] 4,435,513

[45] Mar. 6, 1984

[54] SINTERED BODIES OF ALUMINUM NITRIDE

[75] Inventors: Katsutoshi Komeya, Oiso; Akihiko Tsuge, Yokohama; Hiroshi Inoue, Kawaguchi, all of Japan

[73] Assignee: Tokyo Shibaura Denki Kabushiki Kaisha, Kawasaki, Japan

[21] Appl. No.: 420,842

[22] Filed: Sep. 21, 1982

[30] Foreign Application Priority Data

Sep. 28, 1981 [JP] Japan ................................. 56-152141

[51] Int. Cl.³ ...................... C04B 35/52; C04B 35/58
[52] U.S. Cl. .......................................... 501/96; 501/98
[58] Field of Search .................................... 501/96, 98

[56] References Cited

U.S. PATENT DOCUMENTS 3,649,314 3/1972 James ................................... 501/96
3,833,389 9/1974 Komeya et al. ....................... 501/96

FOREIGN PATENT DOCUMENTS 50-23411 3/1975 Japan.
54-100410 8/1979 Japan ................................... 501/96
56-9475 3/1981 Japan.

OTHER PUBLICATIONS

Komeya et al., "Effect of Various Additives on Sintering of Aluminum Nitride", *Yugyo-Kyukai-shi,* 89[6], 58, Jun. 1981.

Primary Examiner—Mark Bell
Attorney, Agent, or Firm—Schwartz, Jeffery, Schwaab, Mack, Blumenthal & Koch

[57] ABSTRACT

There is disclosed a sintered body of aluminum nitride comprising a sintered body of powder mixture containing (a) AlN powder: 100 parts by weight,
(b) at least one compound selected from CaO, BaO, SrO and a compound capable of being converted into one of these oxides by sintering: 0.05 to 6 parts by weight, and
(c) carbon powder or powder of a compound capable of being converted into carbon by sintering: more than 0 to not more than 7 parts by weight.

The sintered bodies of aluminum nitride according to this invention have high density and excellent properties such as high thermal conductivity.

7 Claims, No Drawings

SINTERED BODIES OF ALUMINUM NITRIDE

BACKGROUND OF THE INVENTION

This invention relates to sintered bodies of aluminum nitride, more particularly, sintered bodies of aluminum nitride which have high density and are excellent in various properties for practical use.

Sintered bodies of aluminum nitride (AlN) have been noted as starting materials having properties essential to high-temperature materials, such as heat resistance, corrosion resistance or high-temperature impact resistance, and also as materials having high thermal conductivity.

In the meantime, it is required that sintered bodies of AlN have high density in order to allow them to exhibit these various properties. For this reason, many efforts have hitherto been made to establish the technique for preparing sintered bodies of AlN having high density.

Such sintered bodies of AlN are usually obtained by molding AlN powder, followed by sintering. However, in the process in which AlN powder is used alone, high density sintered bodies can not be obtained due to poor sinterability thereof, and the density of the sintered bodies is considerably low, i.e., at most 82% of the absolute density.

For this reason, an attempt to utilize a method of sintering under pressure in which a hot pressing is employed has been made but a satisfactory result has not been obtained. Moreover, a method has been tried in which rare earth elements' oxides such as yttrium oxides ($Y_2O_3$), lanthanum oxides ($La_2O_3$) or the like are added to AlN powder as sintering aids to obtain sintered bodies of considerably higher density.

However, this method has disadvantages in that it has difficulties in view of cost, due to the expensiveness of rare earth oxides, and that conductivity of $AlN-Y_2O_3$ series sintered bodies is liable to be lower so that high thermal conductivity inherent to AlN can not be maintained and exhibited.

There is disclosed in Japanese Provisional Patent Publication No. 23411/1975, a process for preparing sintered bodies of AlN in which calcium oxide (CaO), barium oxide (BaO), strontium oxide (SrO) or the like is added as a sintering aid. It was found that these sintering aids are effective additives for imparting to the sintered bodies characteristics inherent to AlN since a small amount of such a sintering aid forms a liquid phase at a high temperature, which is advantageous for the densification of sintered bodies of AlN.

On the other hand, it was found that AlN powder, which is a main starting material for sintered bodies of AlN, is liable to contain oxygen or oxides, unavoidably mixed at the time of its preparation, and they produce a harmful effect on maintaining the excellent properties of sintered bodies of AlN. Namely, oxygen is liable to dissolve in AlN powder to form a solid solution so that it often exists not only on the surface of AlN powder but also within the inner part of the powder. Moreover, oxygen may also be incorporated in the form of $Al_2O_3$ during the preparation of AlN. Accordingly, when sintering of AlN powder is carried out at high temperature, oxygen remains in the state of a solid solution or is converted to a compound having, for example, a 'spinel type structure' defined by the formula $(AlN)_x(Al_2O_3)_y$ (wherein x and y individually represent a given natural number) and so on, resulting in impairing the excellent properties such as high thermal conductivity and the like, which are inherent to AlN. Therefore, in the conventional sintered bodies of AlN or the process for preparing thereof, above-mentioned problems have not been solved at all.

SUMMARY OF THE INVENTION

An object of this invention is to eliminate the problems of the prior art and provide sintered bodies of aluminum nitride which have high density and are excellent in various properties for practical use, such as thermal conductivity and so on.

The present inventors have made extensive studies to remove the above-mentioned disadvantages in the conventional sintered bodies of AlN and the process for preparing them. As the result, the present inventors have found that by adding CaO, BaO, SrO or a compound capable of being converted into one of these oxides by sintering, and carbon powder, or a powder of resin capable of being converted into carbon by sintering or the like, to oxygen-containing AlN powder which is a starting material for preparing sintered bodies of AlN, the formation of said compound having spinel type structure and so on is inhibited so that sintered bodies of AlN are obtained which have high density and maintain or exhibit various excellent properties for practical use, such as high thermal conductivity and so forth, which are inherent to AlN, and that addition of carbon is effective in reducing and removing oxygen present in AlN which is a starting material, so that a higher purity of AlN crystalline particle can be synthesized, and have accomplished this invention.

Namely, a sintered body of aluminum nitride of this invention comprises a sintered body of powder mixture containing (a) 100 parts by weight of aluminum nitride powder, (b) 0.05 to 6 parts by weight (calculated in terms of calcium oxide, barium oxide, strontium oxide or mixture thereof) of powder of at least one compound selected from calcium oxide, barium oxide, strontium oxide and a compound capable of being converted into one of these oxides by sintering, and (c) more than 0 to not more than 7 parts by weight (calculated in terms of carbon) of carbon powder or a compound capable of being converted into carbon by sintering.

On a percentage basis, or a basis of 100 parts by weight of the total composition, the composition would be 0.047 to 5.66 percent or parts by weight, preferably 0.047 to 3.85 of (b), more than 0 to not more than 6.54 percent or parts by weight, preferably 0.0094 to 4.76 of (c), and the balance to 100 percent or parts by weight aluminum nitride.

DETAILED DESCRIPTION OF PREFERRED EMBODIMENTS

The above-mentioned aluminum nitride powder (a) employed in this invention is a product prepared industrially by the usual method and contains such impurities as oxygen, non-stochiometrical oxides of aluminum or aluminum oxides ($Al_2O_3$) and so on, which are unavoidable during the preparation of AlN powder. Generally, in the case where the concentration of oxygen in AlN powder exceeds 5%, it becomes difficult to remove all oxygen present in such high concentration, even if the above-mentioned (c) i.e., carbon or a compound capable of being converted into carbon by sintering is added in a large amount corresponding to that of oxygen. Accordingly, the concentration of oxygen contained in the above-mentioned aluminum nitride powder (a) may preferably be not more than 5% and, more preferably, not more than 3%.

As such AlN powder, particle diameter thereof may preferably be not more than 5 $\mu$m and, more preferably, not more than 2 $\mu$m.

The compounds (b) mentioned above employed in this invention, which are calcium oxide, barium oxide, strontium oxide or a compound capable of being converted into one of these oxides by sintering, function as sintering promoters of the sintered bodies. The amount of the above-mentioned powder (b) to be formulated in the above-mentioned mixed powder, may preferably be 0.05 to 6 parts by weight and more preferably be 0.05 to 4 parts by weight based on 100 parts by weight of the above-mentioned AlN powder, being calculated in terms of CaO, BaO, SrO or mixture thereof. When the content of these oxides is less than 0.05 part by weight, condensation of the sintered body is insufficient, and on the other hand, if the content exceeds 6 parts by weight, it is not preferable since the thermal conductivity of the sintered body deteriorates while condensation is sufficient.

As the compound (b) mentioned above employed in this invention, which is capable of being converted into an oxide selected from calcium oxide, barium oxide and strontium oxide, there may be mentioned, for example, calcium carbonate, barium carbonate, strontium carbonate, calcium nitrate, barium nitrate, strontium nitrate, calcium hydroxide, barium hydroxide, strontium hydroxide, calcium oxalate, barium oxalate, strontium oxalate and so on. Particle diameter of the compound (b) mentioned above, i.e., at least one kind of compound selected from calcium oxide, barium oxide, strontium oxide and a compound capable of being converted into one of these oxides, may preferably be in the range of 0.01 to 2 $\mu$m and, more preferably 0.1 to 1 $\mu$m.

In the compound (b) mentioned above, other compounds, for example, oxides of titanium (Ti), zirconium (Zr) or the like, may contaminated in the sintered bodies in the range between 0 and 2% by weight based on the oxides of Ca, Ba and Sr.

The compound (c) used in the present invention, which is carbon or a compound capable of being converted into carbon by sintering, contributes to inhibit the formation of a compound having spinal type structure, reduce and eliminate oxygen in the AlN starting material, and promote formation of AlN sintered bodies having excellent characteristics such as high density, high thermal conductivity and so on. The amount of the above-mentioned carbon powder or powder of a compound capable of being converted into carbon by sintering, which is to be blended in the above-mentioned mixed powder may preferably be in the range of more than 0 to not more than 7 parts by weight based on 100 parts by weight of the above-mentioned aluminum nitride powder (a), being calculated in terms of the amount of carbon per se, more preferably in the range of 0.5 to 5 parts by weight. The amount of the carbon depends upon the amount of oxygen which is present in the AlN powder. When the carbon content exceeds 7 parts by weight, carbon is left unremoved so that it impairs various properties of AlN for practical use, such as sinterability, thermal conductivity and so on.

The above-mentioned carbon powder (c) includes graphite, carbon black and so on, and the powdery substance capable of being converted into carbon upon by sintering includes sugar, a phenol resin, a styrene resin and so on. While the particle diameter of these powders is not particularly critical, it may preferably be in the range of 0.01 to 0.5 $\mu$m in view of handling thereof.

The above-mentioned mixed powder according to this invention may generally contain a binder (a molding aid) such as paraffin, stearic acid, polyvinyl alcohol and the like in addition to the above-mentioned components (a) to (c).

The sintered bodies of aluminum nitride of this invention are obtainable by treating as follows. Namely, a process for preparing sintered bodies of aluminum nitride may comprise molding a mixed powder containing above-mentioned predetermined amount of (a) powder of aluminum nitride,
(b) powder of at least one compound selected from calcium oxide, barium oxide, strontium oxide or a compound capable of being converted into one of these oxides by sintering, and
(c) powder of carbon or powder of a compound capable of being converted into carbon by sintering followed by sintering the thus molded powder.

In this invention, the above-mentioned mixed powder is molded by applying suitable molding pressure, for example, 0.3 to 2 ton/cm$^2$, at an ordinary temperature and the thus obtained molded bodies, as occasion demands, are heated for the purpose of evaporating off the binder. In cases where powder of a substance capable of being converted into carbon by sintering is employed as the above-mentioned powder (c), or powder of a compound capable of being converted into one oxide selected from calcium oxide, barium oxide, and strontium oxide by sintering is employed as the above-mentioned powder (b), the mixed powder is further heated followed by sintering the thus obtained molded bodies. An atmosphere for sintering may preferably be a non-oxidative one containing nitrogen gas ($N_2$) (a mixed gas of $N_2$—argon gas (Ar), $N_2$—hydrogen gas ($H_2$), or $N_2$—carbon monoxide (CO) and so on) and sintering temperature is generally in the range of 1600° to 2000° C. and may preferably be in the range of 1700° to 1850° C., ordinarily for about 0.5 to 5 hours.

Moreover, the sintered material may be subjected to treatment by hot isostatic pressing (HIP) for higher densification and it is also possible to apply hot pressing in the sintering step.

According to this invention, the sintered bodies of AlN having high density can be obtained without impairing excellent properties such as high thermal conductivity inherent to AlN, by adding carbon powder or the like to AlN powder which is a starting material for the sintered bodies to suppress the formation of a harmful substance such as spinel etc. formed at the sintering step as well as by adding oxides such as calcium oxide or the like.

Accordingly, the sintered bodies of AlN of this invention have high density, are excellent in various properties for practical use, such as mechanical properties or thermal properties and so on, and are industrially extremely advantageous.

EXAMPLE 1

Under a pressure of 2 ton/cm$^2$, there was molded a mixed powder containing 97 parts by weight of AlN powder having an average particle diameter of 1.2 $\mu$m, 1.5 parts by weight of carbon powder having an average particle diameter of not more than 0.1 $\mu$m, 1.5 parts by weight of $CaCO_3$ powder having an average particle diameter of 0.3 μm and 5 parts by weight of paraffin as a binder, to obtain a plate-like molded body (30 mm×30 mm×20 mm).

After the thus obtained molded body was preheated at a temperature of up to 400° C. in a $N_2$ atmosphere, it was put into an AlN crucible, being packed with AlN powder as a padding material therearound, was sintered at a temperature of 1800° C. in a $N_2$ atmosphere for 30 minutes, and the sintered body was obtained.

COMPARATIVE EXAMPLE 1

A sintered body was obtained from the same material and in the same manner as in Example 1 except that carbon powder was not blended.

A relative density relative to a true density and thermal conductivity of the thus obtained sintered bodies in Example 1 and Comparative Example 1 were measured. The results were shown in following Table 1.

TABLE 1

|  | Relative density (%) | Thermal conductivity (cal/cm · sec. °C.) |
|---|---|---|
| Example 1 | 98.5 | 0.15 |
| Comparative Example 1 | 98.4 | 0.10 |

As seen from Table 1, it is confirmed that the sintered body of AlN of this invention has thermal conductivity around 50% higher than that of the conventional sintered body of which carbon powder is not blended.

EXAMPLES 2 TO 9

Mixed powders containing AlN powder, carbon powder and $CaCO_3$ powder (the average particle diameters of which are 1.2 μm, not more than 0.1 μm and 0.5 μm, respectively) being incorporated with paraffin as a binder, and having the compositions shown in Table 2 were each molded and sintered in the same manner as in Example 1 to obtain sintered bodies. Sintering was carried out for 60 minutes in a stream of $N_2$ having a flow rate of 3 l/min. In Examples 7 to 9, sintering temperature were varied so as to be 1750° to 1850° C., respectively.

Relative density and thermal conductivity of the sintered bodies of AlN thus prepared of this invention were measured. The results are shown in Table 2.

COMPARATIVE EXAMPLES 2 TO 4

A sintered bodies were obtained from the same material and were each molded and sintered in the same manner as in Example 1 except that the compositions were varied.

Three kinds of sintered bodies of AlN thus prepared were tested for relative density and thermal conductivity in the same manner as in Examples 1 and 2. The results are shown in Table 2 together with their compositions.

TABLE 2

|  | Composition (parts by weight) | | | | Sintering condition | | Relative density (%) | Thermal conductivity (cal/cm · sec. °C.) |
|---|---|---|---|---|---|---|---|---|
|  | AlN | C | $CaCO_3$ | Paraffin | Temperature (°C.) | Period of time (min) | | |
| Example 2 | 98.8 | 1 | 0.2 | 5 | 1800 | 60 | 98.5 | 0.17 |
| Example 3 | 97.5 | 2 | 0.5 | " | " | " | 99.3 | 0.16 |
| Example 4 | 97 | 2 | 1 | " | " | " | 99.0 | 0.16 |
| Example 5 | 95 | 3 | 2 | " | " | " | 98.5 | 0.15 |
| Example 6 | 97 | 3 | 4 | " | " | " | 98.5 | 0.15 |
| Example 7 | 96 | 2 | 2 | " | 1780 | " | 98.5 | 0.17 |
| Example 8 | 96 | 2 | 2 | " | 1750 | " | 98.0 | 0.17 |
| Example 9 | 98.8 | 1 | 0.2 | " | 1850 | " | 99.5 | 0.16 |
| Comparative Example 2 | 99 | 0 | 1 | " | 1800 | " | 99.0 | 0.12 |
| Comparative Example 3 | 98 | 2 | 0 | " | " | " | 82.5 | — |
| Comparative Example 4 | 90 | 2 | 8 | " | " | " | 97.2 | 0.10 |

As seen from Table 2, it is confirmed that the sintered bodies having excellent thermal conductivity were obtained when the aluminum nitride-carbon-calcium oxide series having predetermined compositions of the starting material is used.

EXAMPLE 10

A sintered body was obtained in the same manner as in Example 1, by using, as a starting material, a mixed powder consisting of 96 parts by weight of AlN powder having an average particle diameter of 1.2 μm, 2 parts by weight of carbon powder having an average particle diameter of not more than 0.1 μm, 2 parts by weight of $BaCO_3$ powder having an average particle diameter of 0.5 μm and 5 parts by weight of paraffin as a binder. It is confirmed that the thus obtained sintered body possessed high relative density as much as 98.9% and also high thermal conductivity as much as 0.16 cal/cm-.sec.°C.

EXAMPLE 11

A sintered body was obtained in the same manner as in Example 1, by using, as a starting material, a mixed powder consisting of 96.5 parts by weight of AlN powder having an average particle diameter of 1.2 μm, 1.5 parts by weight of carbon powder having an average particle diameter of not more than 0.1 μm, 2 parts by weight of $SrCO_3$ powder having an average particle diameter of 0.5 μm and 5 parts by weight of paraffin as a binder. The thus obtained sintered body was found to possess high relative density as much as 98.9% and also high thermal density as much as 0.15 cal/cm.sec.°C.

EXAMPLE 12

Under a pressure of 2 ton/$cm^2$, there was molded a mixed powder consisting of 96 parts by weight of AlN powder having an average particle diameter of 1.2 μm, 2 parts by weight of carbon powder having an average particle diameter of not more than 0.1 μm, 2 parts by weight (calculated in terms of BaO) of Ba(NO$_3$)$_2$ having an average particle diameter of 1.4 μm and 5 parts by weight of paraffin as a binder, to obtain a disk-like molded body (30 mmφ×10 mm). After the thus obtained molded body was preheated at a temperature up to 400° C. in a stream of N$_2$, it was put into an AlN crucible, being packed with AlN powder as a padding material therearound, and was sintered at 1800° C. in a N$_2$ atmosphere for 30 minutes. The thus obtained sintered body was found to possess high density as much as 98.2% and also high thermal conductivity as much as 0.15 cal/cm.sec.°C.

EXAMPLE 13

A sintered body was obtained in the same manner as in Example 1, by using, as a sintering material, a mixed powder consisting of 96 parts by weight of AlN powder having an average particle diameter of 1.8 μm, 2 parts by weight of carbon powder having an average particle diameter of 0.1 μm, 1 part by weight (calculated in terms of CaO) of CaCO$_3$ powder having an average particle diameter of 1.0 μm, 1 part by weight of Al$_2$O$_3$ powder and 5 parts by weight of paraffin as a binder. The thus obtained sintered body was found to possess high relative density as much as 98.8% and also high thermal conductivity as much as 0.15 cal/cm.sec.°C.

EXAMPLES 14 AND 15

Sintered bodies obtained in Examples 1 and 10 were subjected to treatment of hot isostatic pressing (HIP) at a temperature of 1750° C. under a pressure of 1000 atm for one hour. As the result, shown in Table 3, the densities and thermal conductivities of these sintered bodies were found to have been improved.

TABLE 3

| | HIP treated sintered body | Relative density (%) | | Thermal conductivity (cal/cm · sec. °C.) | |
|---|---|---|---|---|---|
| | | before treating | after treating | before treating | after treating |
| Example 14 | Example 1 | 98.5 | >99 | 0.15 | 0.17 |

TABLE 3-continued

| | HIP treated sintered body | Relative density (%) | | Thermal conductivity (cal/cm · sec. °C.) | |
|---|---|---|---|---|---|
| | | before treating | after treating | before treating | after treating |
| Example 15 | Example 10 | 98.9 | >99 | 0.15 | 0.17 |

We claim:
1. A sintered body of aluminum nitride obtained by sintering a powder mixture consisting essentially of
   (b) from about 0.047 to about 5.66 parts by weight (calculated in terms of calcium oxide, barium oxide, strontium oxide or mixtures thereof) of a powder of at least one compound selected from the group consisting of calcium oxide, barium oxide, strontium oxide and a compound capable of being converted into one of these oxides by sintering,
   (c) an amount more than 0 and up to about 6.54 parts by weight (calculated in terms of carbon) of carbon powder or powder of a compound capable of being converted into carbon by sintering, sufficient in combination with ingredient (b) to increase the density and thermal conductivity of the body; and
   (a) aluminum nitride powder being the balance, the total amount of ingredients (a), (b) and (c) being 100 parts by weight.
2. A sintered body of aluminum nitride according to claim 1, wherein the compounding amount of the ingredient (b) is in the range of 0.047 to 3.85 parts by weight.
3. A sintered body of aluminum nitride according to claim 1 or 2, wherein the compounding amount of the ingredient (c) is in the range of 0.0094 to 4.76 parts by weight.
4. A sintered body of aluminum nitride as in claim 1, wherein ingredient (b) comprises calcium oxide, barium oxide, strontium oxide, calcium carbonate, barium carbonate, strontium carbonate, calcium nitrate, barium nitrate, strontium nitrate, calcium hydroxide, barium hydroxide, strontium hydroxide, calcium oxalate, barium oxalate or strontium oxalate.
5. A sintered body of aluminum nitride as in claim 4, wherein ingredient (b) comprises calcium oxide, calcium carbonate, barium carbonate, strontium carbonate or barium nitrate.
6. A sintered body of aluminum nitride as in claim 1, wherein ingredient (c) comprises graphite, carbon blac, sugar, a phenol resin, or a styrene resin.
7. A sintered body of aluminum nitride as in claim 1, wherein ingredient (c) comprises carbon powder.

* * * * *